UNITED STATES PATENT OFFICE.

ADOLF CLEMM, OF MANNHEIM, GERMANY.

MANUFACTURE OF ALUMINA AND ALKALI SULFUR SALTS.

No. 848,612.          Specification of Letters Patent.          Patented March 26, 1907.

Original application filed April 5, 1906, Serial No. 310,099. Divided and this application filed January 12, 1907. Serial No. 352,025.

*To all whom it may concern:*

Be it known that I, ADOLF CLEMM, a subject of the Emperor of Germany, residing at Mannheim, Germany, have invented certain new and useful Improvements in Manufacture of Alumina and Alkali Compounds Containing Sulfur, of which the following is a specification.

This invention has for its object to convert bauxite or other aluminiferous material and alkali sulfate into certain other useful products; and it consists in the process substantially as hereinafter set forth for accomplishing this object.

This application is a division of my application, Serial No. 310,099, filed April 5, 1906, wherein I have set forth and claimed a similar process.

In carrying out this process alkali sulfate and carbon are intimately mixed with bauxite or similar aluminiferous material in such proportions of the sulfate and carbon as are multiples of those theoretically required to form an alkali aluminate. As an example, one hundred parts, by weight, of bauxite (containing about sixty-one per cent. $Al_2O_3$) are mixed with three hundred parts of sulfate of soda and sixty parts of carbon; but I do not confine myself to the proportions given, as the quality of the raw materials employed may render them more or less variable. This mixture is calcined and the calcined mass lixiviated with water, when an alkali aluminate and an excess of alkali sulfid are obtained in a solution which is generally of a yellowish or greenish color and can be clarified by allowing it to stand or by filtration. By treating this solution with sulfureted hydrogen, preferably also with the application of heat, the alumina of the bauxite used is obtained as a white precipitate of aluminium hydroxid and a solution of sodium sulfohydrate and sodium sulfid remains. The alumina having been separated from this solution, the latter may be used directly for many purposes in the chemical industry. It can, however, be converted into thiosulfate by passing through it sulfurous acid, or sodium sulfid may be obtained by it in a well-known manner.

The residue remaining from the above-described lixiviation of the calcined mass retains as a rule some alkali and sulfur compounds, from which further quantities of thiosulfate may be obtained. This is effected in the manner described in my original application above referred to by treating said residue (to which some milk of lime may be added in order to accelerate the oxidation) with an oxidizing agent—for instance, as by allowing it to effloresce in the air or by blowing air through said residue—the mass being thereupon lixiviated with water and thiosulfate allowed to crystallize out of the liquor thus obtained after it has been suitably concentrated.

I claim—

1. In the process of manufacturing alumina the steps which consist in mixing aluminiferous material with quantities of alkali sulfate and carbon which are multiples of those theoretically required to form an alkali aluminate and calcining the mixture, lixiviating the calcined mass and treating the solution with sulfureted hydrogen substantially as and for the purpose set forth.

2. In the process of manufacturing alumina, the steps which consist in mixing aluminiferous material with quantities of alkali sulfate and carbon, which are multiples of those theoretically required to form an alkali aluminate, calcining the mixture, lixiviating the calcined mass, treating the solution with sulfureted hydrogen, separating the thus-obtained precipitate from the remaining solution and treating the latter with sulfurous acid substantially as and for the purpose set forth.

3. In the process of manufacturing alumina, the steps which consist in mixing aluminiferous material with quantities of alkali sulfate and carbon, which are multiples of those theoretically required to form an alkali aluminate, calcining the mixture, lixiviating the calcined mass, treating the solution with sulfureted hydrogen, separating the thus-obtained precipitate from the remaining solution and treating the latter with sulfurous acid, treating the insoluble residues of the lixiviated calcined mass with oxidizing agents, treating the products of oxidation with water concentrating the solution thus obtained, and allowing the thiosulfate contained therein to be crystallized out substantially as and for the purpose set forth.

In testimony whereof I affix my signature in presence of two witnesses.

ADOLF CLEMM.

Witnesses:
    H. W. HARRIS,
    JOS. H. LEUTE.